United States Patent Office 3,295,876
Patented Jan. 3, 1967

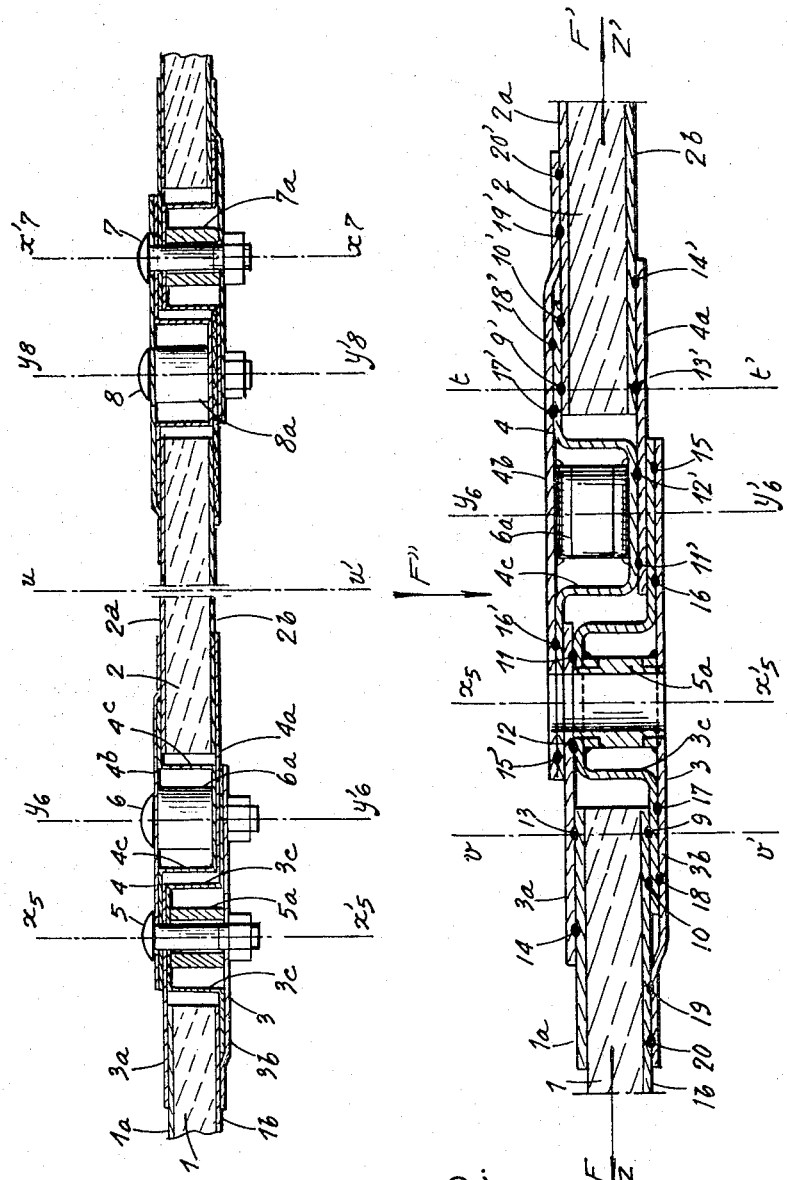

3,295,876
JUNCTION DEVICE FOR REMOVABLE PANELS
Charles Molin, Chatenay-Malabry, and Marius Pinchemel, Paris, France, assignors to Nord-Aviation Societe Nationale de Constructions Aeronautiques, Paris, France, a joint-stock company of France
Filed Mar. 12, 1965, Ser. No. 439,389
Claims priority, application France, Mar. 16, 1964, 967,613
6 Claims. (Cl. 287—189.36)

The present invention relates to a junction device for removable panels and more particularly to a device intended for joining together panels having a composite core, which are constituted by two thin sheets between which is placed a cellular or like material, ensuring the rigidity of the panel and which are characterized by a very high weight/inertia ratio.

In certain industries, and especially in the aero-spatial industry, it is often necessary to join various panels together, for example for the fabrication of inspection doors for rockets, these panels being in particular of the composite-core type employed in any particular construction, so as to be at the same time very robust and easily movable. For reasons of lightness, and by virtue of the elimination of reinforcement, it is sought to make the movable panel take its share in the mechanical strength of the whole of the construction, after having ensured its mechanical coupling to the remainder of the construction.

The present invention particularly comprises the production of:

A junction device coupling together two panels mechanically and in a rigid manner, in particular, panels with composite cores such that the mechanical stresses to which one is subjected are transmitted to the other and taking their share in the strength of the assembly constituted by the said panels;

A junction device joining together mechanically and in a rigid manner panels of any kind, causing each of them to take part in the mechanical strength of the unit constituted by the said panels and having inherent mechanical characteristics at least equivalent to those of each of the said panels;

A junction device permitting the easy assembly and dismantling of the panels at the same time causing each of the panels when assembled to contribute to the strength of the whole;

A junction device the form of which can be adapted by construction to any form of the panels to be assembled and also to any outline of joint of the said panels.

The characteristic features and advantages of the present invention will become apparent during the course of the detailed description which follows below together with the accompanying diagrammatic drawings, and which gives by way of example and in a non-limitative manner, possible forms of embodiment of the present invention.

In these drawings:

FIG. 1 is a view in transverse section taken in the axis of a flat circular inspection door, connected to the walls of a construction through the intermediary of a junction device according to the invention.

FIG. 2 is a view in enlarged cross-section of the junction device previously referred to.

FIG. 1 shows by way of example a flat, circular inspection door 2 having an axis $u$–$u'$ mounted in the closed position on a flat wall 1 of a construction through the intermediary of a junction device in accordance with one form of embodiment of the invention. The inspection door 2 and the wall 1 are constituted by identical structure panels with composite cores, of which the outer metal sheets $2a$, $2b$ have been shown for the door and $1a$, $1b$ for the wall.

The junction device according to the invention is constituted by two constructional elements 3 and 4 on the edge of the opening, rigidly fixed respectively to the wall 1 and the door 2, located substantially in the common plane of the two panels to be joined together, of which the plan view is circular and the section of which is such that the said edge elements 3 and 4 fit into each other and partly overlap each other along two parallel shoulders, the coupling between the said edge elements being ensured by two circular and concentric rows of bolts which are placed in rows of holes pierced for that purpose in each of the elements 3 and 4; in FIG. 1 there have been shown only the bolts 5 and 7 located in the plane of the figure, and the bolts 6 and 8 located in the immediate vicinity. The structure, the dimensions of the border elements 3 and 4, the number, the dimensions and the arrangement of the bolts are such that the junction device thus constituted withstands, after assembly, all the mechanical stresses to which the said device may be subjected either directly or through the intermediary of each of the assembled panels.

The border element 3, rigidly fixed to the panel 1 forming the wall, is constituted by a U-section $3c$, parallel to the junction outline, comprising lateral flanges parallel to the bottom of the said section, and by two flat strips $3a$ and $3b$ supported respectively on the bottom and on the lateral flanges of the section $3c$ to which the said flat strips are assembled, for example by welding.

As can be seen more readily from FIG. 2, the height of the U-section $3c$ corresponds to the thickness of the panel 1 with a composite core, the outer face of the bottom of the section $3c$ being located strictly in the plane of the outer face of the sheet $1a$ of the panel 1, and the section $3c$ is coupled in a rigid manner, for example by welding, to the sheet $1b$ of the panel 1 by one of its lateral flanges supported on the said panel, this coupling having been shown diagrammatically by the points 9 and 10.

The flat strip $3a$ is coupled in a rigid manner, for example by welding, on the one hand to the bottom of the section $3c$, and on the other hand to the sheet $1a$ of the panel 1, these connections being shown by the points 11, 12, 13 and 14.

The flat strip $3b$ is coupled in a rigid manner, for example by welding, on the one hand to the lateral flanges of the section $3c$, and on the other hand to the sheet $1b$, after having formed a slight elbow so as to come level with it, these connections being shown by the points 15, 16, 17, 18, 19 and 20.

The border element 3 thus constituted and rigidly connected to the panel 1 is pierced with two circular and concentric rows of holes having their axes perpendicular to the plane of the panel 1, intended for the passage of the assembly bolts having the same axes, the holes of the inner row, of which there have been shown the axes $x'_5$–$x_5$ and $x'_7$–$x_7$ corresponding to the bolts 5 and 7, having their axes substantially in the plane of symmetry of the section $3c$, the outer row of which has been represented by the axes $y'_6$–$y_6$ and $y'_8$–$y_8$ corresponding to the bolts 6 and 8, being located in the flange of the section $3c$ which is not fixed to the sheet $1b$, the axes of two bolts which are adjacent but in different rows such as 5 and 6 or 7 and 8 not being located preferably in the same plane passing through the axis $u'$–$u$ of the inspection door 2. At right angles to the holes of the inner row, and in the interior of the section $3c$, there are placed spacing members, of which only those marked $5a$ and $7a$ have been shown, corresponding to the bolts 5 and 7, these spacers having the function of opposing the pressure of the said bolts and, by virtue of their fixing, resulting for example from a joggle-joint fitting in welded washers to the section $3c$ and the flat strip $3b$, of increasing the hammering surface of the said bolts.

The border element 4, rigidly fixed to the panel 2 constituting the inspection door, is formed strictly in the same manner as the border element 3, the inner face of the said element 3 becoming the outer face of the element 4 and conversely; in addition the holes intended for the passage of the bolts through the element 4 are such that the axes and the radii of the holes of the outer row of the border element 4 coincide with those of the inner row of the element 3 and conversely. The various constituent parts $3a$, $3b$, $3c$, $5a$, $7a$ of the element 3 correspond to the constituent parts marked respectively $4a$, $4b$, $4c$, $6a$, $8a$ of the element 4 and the various connections shown by the points 10 to 20 of the element 3 correspond to the connections marked respectively $10'$ and $20'$ of the element 4.

After the placing in position of the assembly bolts 5, 7, etc., 6, 8, etc., it can readily be seen from FIGS. 1 and 2 that the readily removable panels 1 and 2 are substantially in the same plane and that the junction device according to the invention is substantially contained in the thickness of the same panels, the border elements 3 and 4 being interleaved in an accurate manner one on the other.

In FIG. 2 it can be seen that the border elements 3 and 4, when once assembled together by the two rows of bolts, themselves form a rigid panel with a composite core, of which the various features, that is to say in particular the dimensions, the mechanical characteristics of the various flat strips and sections, the number, the dimensions and the positions of the assembly bolts can be determined so that the strength of the said junction device in respect of the various mechanical stresses to which it will be subjected, is at least equal to that of the panels 1 and 2.

In particular, between the axes $v'-v$ and $t'-t$ passing through the end connection points 9 and 13, $9'$ and $13'$ of the border elements 3 and 4 to the corresponding panels 1 and 2, the axis $x'_5-x_5$ and the axis of the section $4c$ located in the plane of the section form three rigid casings and the various elements of the junction device can be determined so that the moment of inertia of these casings with respect to an axis $z'-z$ passing substantially through the central plane of the panels 1 and 2 is equal to that of the said panels with respect to the same axis, thus permitting the reaction of the junction device according to the invention to bending forces $F''$ normal to the device. The resistance to tensile stresses applied along $F'$, F in the plane of the panels 1 and 2 will be ensured by the resistance to shear of the connections 9 to 20, of the connections $9'$ to $20'$ and of the assembly bolts, which are designed accordingly. The resistance to compression stresses applied along FF' but in the opposite direction, depends on the one hand on the same elements as before and on the other hand on the resistance to bending of the flat strips $3a$, $3b$, $4a$, $4b$, this resistance being conditioned by the distances between the various axes $v'-v$, $x'_5-x_5$, $y'_6-y_6$, $t'-t$, which distances are always as small as possible.

It will of course be understood that the junction device according to the invention, as described above, can be applied to any type of coupling. In particular, the line of junction may be straight or not, closed or not, flat or not. In this latter case, the portions of the various sheets and sections which are supported on the assembled panels will be formed in such manner as to follow the outline of the assembly.

The present invention is not limited to the forms of embodiment described and shown and it can be modified without thereby departing from the scope of the present invention. In particular, the structure of the panels may be of any kind and may make use of any materials identical or not, such as metals, metal alloys, synthetic materials. The panels to be assembled together with a full core or otherwise, may be of different natures. The form and the dimensions of the panels may be as desired, as may also be the junction lines.

Other forms of coupling and construction of the junction device may be utilized; in particular it is possible to use any other type of assembly of different constituent elements to each other or to the panels to be assembled, other than welding, for example by riveting, screwing, etc. and other methods of connection of the U-sections with the panels to be assembled.

Other methods of assembly of the border elements to each other than bolting can also be employed, for example a method of coupling by pins. Also, by placing particularly in parallel in the border elements a number of U-sections with lateral flanges, it is possible to ensure the connection of the said border elements by more than two rows of bolts, parallel to the outline of the junction.

We claim:

1. A junction device permitting two panels, and especially two panels with composite cores, to be mechanically coupled together at will in a rigid manner, said device comprising:
    an end-to-end assembly in two parts, each of said parts being fixed to one of said panels;
    two parallel junction shoulders in said assembly,
    and means permitting said two assembly portions to be coupled together at the level of said shoulders,
    whereby the mechanical forces applied to one of the panels are transmitted to the other panel, while the assembly itself contributes to the strength of the whole structure.

2. A junction device as claimed in claim 1, in which: the two parts of said end-to-end assembly are constituted by borders forming casings disposed head-to-foot and overlapping partially and parallel to each other while fitting into each other.

3. A junction device as claimed in claim 1, in which: the means permitting the coupling of said two assembly parts are constituted by at least two rows of bolts and define a third casing.

4. A junction device permitting two panels, and especially two panels with composite cores, to be mechanically coupled together at will in a rigid manner, said device comprising:
    an end-to-end assembly in two parts, each of said parts being constituted by a section with projecting flanges forming a casing and fixed to one of said panels,
    two parallel junction shoulders in said assembly, the sections partly overlapping and parallel while fitting one into the other,
    and at least two rows of holding bolts passing through said sections perpendicular to the general plane of said panels and therefore to the plane of the whole structure and forming between said sections a third casing.

5. A junction device as claimed in claim 4, in which each said section is joined to its panel by blocking pieces.

6. A junction device as claimed in claim 4, in which spacing members are inserted in said sections and are traversed by said holding bolts.

References Cited by the Examiner
UNITED STATES PATENTS

| | | | |
|---|---|---|---|
| 2,447,272 | 8/1948 | Parkes | 52—578 |
| 2,762,470 | 9/1956 | Parkes et al. | 52—460 |
| 3,147,336 | 9/1964 | Mathews | 189—36 X |

REINALDO P. MACHADO, *Primary Examiner.*

J. K. BELL, *Assistant Examiner.*